United States Patent [19]

Blumenau

[11] Patent Number: 4,831,289
[45] Date of Patent: May 16, 1989

[54] GAS COMPRESSION USING A TWO-PHASE MHD CHANNEL

[75] Inventor: Leif Blumenau, Beer Sheva, Israel

[73] Assignee: Solmecs Corporation N.V., Curacao, Netherlands Antilles

[21] Appl. No.: 49,057

[22] Filed: May 12, 1987

[30] Foreign Application Priority Data

May 21, 1986 [IL] Israel ........................................ 78864

[51] Int. Cl.$^4$ ........................ H02K 44/12; H02N 10/00
[52] U.S. Cl. .................................................... 310/11
[58] Field of Search ............................ 310/10, 11, 300; 417/50; 204/64 R, 68; 322/2; 62/331, 332, 335

[56] References Cited

U.S. PATENT DOCUMENTS

| | | | |
|---|---|---|---|
| 4,381,462 | 4/1983 | Radebold | 310/11 |
| 4,677,326 | 6/1987 | Marks | 310/11 |
| 4,691,130 | 9/1987 | Gillissen | 310/11 |
| 4,749,890 | 6/1988 | Houston | 310/11 |

Primary Examiner—Peter S. Wong
Assistant Examiner—D. L. Rebsch
Attorney, Agent, or Firm—Sughrue, Mion, Zinn, Macpeak & Seas

[57] ABSTRACT

A method for gas compression using a two-phase flow gas/liquid metal MHD pump. The method includes providing an MHD pump having a converging flow duct, mixing the gas to be compressed with a liquid metal, to form a two-phase mixture, compressing the gas in the two phase mixture by driving the mixture through the converging duct, using the MHD effect, the heat of compression of the gas being substantially transferred to said liquid metal, separating the two-phase mixture into its gaseous and metallic components, and reducing the pressure of the metallic component by passing it through a pressure-reducing means. There is also provided an n-stage, two-phase flow MHD compressor system. The compressor has practically no moving parts.

11 Claims, 6 Drawing Sheets

GAS COMPRESSION USING A TWO-PHASE MHD CHANNEL

The present invention relates to a method and system for gas compression using a two-phase flow gas/liquid metal magnetohydrodynamics (MHD) pump.

From reactor-cooling to refrigeration, there exists hardly any cyclic thermodynamic process that, at some stages at least, does not involve the compression of a gas. Great efforts have therefore been invested in the development and design of compressors, as a consequence of which they are today well-built and reasonably efficient. All of them, however, be they of the piston, screw, vane, or any other type, suffer from a common drawback: being mechanical contraptions and having moving parts, they are subject to wear, will sometimes freeze under arctic, and seize under tropical conditions; have lubrication and sealing problems, thus requiring servicing and maintenance; and, in the best of cases, have a service life that is significantly shorter than that of other major components of the plant they are serving.

It is one of the objects of the present invention to overcome these drawbacks and disadvantages, and to provide a gas compressor that has practically no moving parts and is thus very reliable, while being essentially maintenance-free for the duration of its projected life span.

This the invention achieves by providing a method for gas compression using a two-phase flow gas/liquid metal MHD duct, comprising the stages of:

providing an MHD duct having a converging configuration;

mixing the gas to be compressed with a liquid metal, to form a two-phase mixture;

compressing the gas in said two phase mixture by driving said mixture through said converging duct, using the MHD effect, the heat of compression of said gas being substantially transferred to said liquid metal;

separating said two-phase mixture into its gaseous and metallic components, and reducing the pressure of said metallic component by passing it through a pressure-reducing means.

The invention further provides an n-stage, two-phase flow MHD compressor system comprising for each stage:

a mixer having a gas inlet, a liquid-metal inlet and a two-phase mixture outlet, in which mixer a liquid metal is mixed with the gas to be compressed, to form a two-phase mixture;

a two-phase MHD duct having a converging configuration and being located downstream of said mixer, in which duct the gas in said two-phase mixture is compressed by the liquid metal driven therethrough by MHD action;

a separator having a two-phase mixture inlet, a gas outlet and a liquid-metal outlet, and being located downstream of said MHD duct, in which separator said two-phase mixture is separated into its components, and pressure-reducing means located downstream of said separator for reducing the pressure of said metallic component as well as an n-stage energy conversion system, comprising:

an MHD expander, including for each stage:

a heat exchanger receiving heat from a heat source and transferring said heat at least to the liquid metal of a first liquid-metal cycle, a single-phase MHD pump located downstream of said heat exchanger and driving said first cycle;

a mixer having a gas inlet, a liquid-metal inlet and a two-phase mixture outlet, and being located downstream of said MHD pump, in which mixer said liquid metal is mixed with a gas, producing a two-phase mixture;

a two-phase MHD generator located downstream of said mixer, in which generator said two-phase mixture is expanded, producing electrical energy;

a separator having a two-phase mixture inlet, a gas outlet and a liquid-metal outlet, and being located downstream of said MHD generator, in which separator said two-phase mixture is separated into its components, and an MHD compressor, including for each stage:

a mixer having a gas inlet, a liquid-metal inlet and a two-phase mixture outlet, in which mixer the liquid metal of a second liquid-metal cycle is mixed with said gas, producing a two-phase mixture;

a two-phase MHD duct having a converging configuration and being located downstream of said mixer, in which duct the gas in said two-phase mixture is compressed by the liquid metal driven therethrough by MHD action;

a separator having a two-phase mixture inlet, a gas outlet and a liquid-metal outlet, and being located downstream of said MHD pump, in which separator said two-phase mixture is separated into its components;

a single-phase MHD pump located downstream of said separator and driving said second cycle, and a heat exchanger located upstream of said mixer, for rejecting heat drawn from said second liquid-metal cycle, wherein said MHD expander and said MHD compressor are combined by connecting the $n^{th}$-stage separator of said MHD expander with the 1st-stage mixer of said MHD compressor, and the $n^{th}$-stage separator of said MHD compressor with the 1st-stage mixer of said MHD expander, said connection being effected via the hot and cold sides, respectively, of at least one regenerative heat exchanger.

The use of the MHD compressor according to the invention in the cooling system of nuclear reactors would hold further advantages if the cooling gas advertently or inadvertently serves as a carrier for tritium such as could be the case in fusion power plants or molten-salt breeder reactors. Here, the only very infrequent access required would obviate the need for special provisions for tritium barriers at the system boundaries. The system would simply be placed in a cell with walls impermeable to tritium diffusion from which diffusing tritium can be retrieved by well-established methods. All electrical power would be generated in the form of DC-current and the power-plant auxiliary power to the MHD pumps is also DC-current. This would be ideally suited for a magnetic confinement fusion power reactor using normal magnets where the recirculating power fraction (in terms of DC-current) could amount to more than 30%.

It should be noted that the term "n-stage" as used in this specification is meant to include also "single state".

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Figure 1:
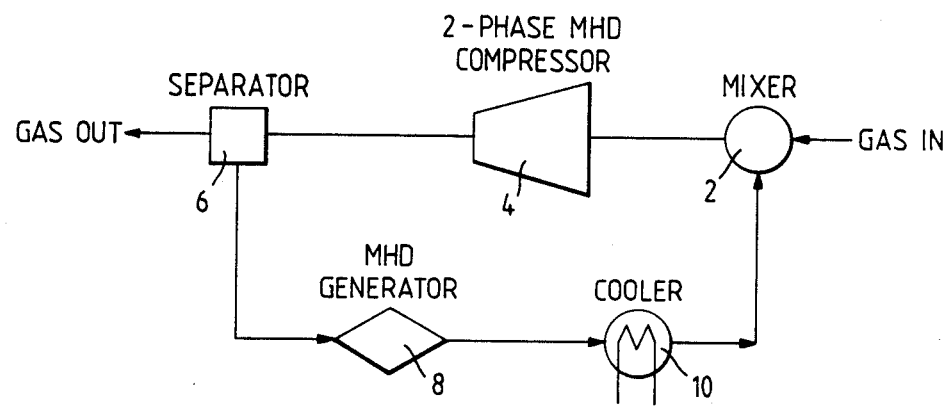
FIG. 1 is a block diagram of a basic, single-stage, two-phase liquid-metal (LM) MHD gas compressor.

Referring now to the drawings, there is seen in FIG. 1 the basic cycle of a two-phase flow (LM)MHD compressor. A liquid metal and a gas (details about which are given further below) are mixed in a mixer 2, producing a two-phase mixture. This mixture enters the MHD compressor 4, which consists of an MHD pump, the duct of which converges in direction of liquid flow. Being driven through this duct by MHD action, the liquid metal in the two-phase mixture compresses the gas, which leaves the duct at a pressure higher than that at which it entered it. Compression, it should be noted, is very nearly isothermal, although some temperature increase will be observed. The heat of compression is absorbed by the liquid metal. Downstream of the MHD compressor 4 there is located a separator 6, in which the two-phase mixture is separated into its components, the gas, as already mentioned, remaining essentially at the same temperature as it had at the inlet of the process, however, with an increased pressure. After separation, the liquid metal is reduced in pressure by passing through an MHD generator 8 and is returned to the mixer via a heat sink 10 in the form of a cooler. Here heat corresponding to the heat of compression is removed, approximately:

$$Q_{comp} = m\, T \int ds = m\, T\, R\, \ln \pi$$

where
$\pi = P_H/P_L$
$\int ds$ = change in entropy
T = temperature of gas
R 32 gas constant
$P_H$ = high pressure
$P_L$ = low pressure
m = mass flow rate of gas The MHD generator 8 delivers some amount of DC current to drive the MHD compressor 4, however, additional power must be provided since the MHD compressor, generally speaking, requires more power than can be generated by the MHD generator.

The liquid metal electrodynamic/heat transport fluid must, of course, be compatible with the thermodynamic working medium gas selected for the gas compression. Compression which usually takes place at a low temperature (ideally as close to the environmental temperature as possible in chilling and power cycles) demands from the liquid metal to have a low melting point, e.g. mercury, eutectics of sodium-potassium or heavy metal alloys.

The thermodynamic working medium should be as inert as possible and not enter into reaction with the liquid metal. All the noble gases and perhaps $N_2$ and $CO_2$ and a multitude of refrigerants may be used here. Naturally, steam can be used for example with lead alloys, but a suitable applications areas is not easily found.

Figure 3:
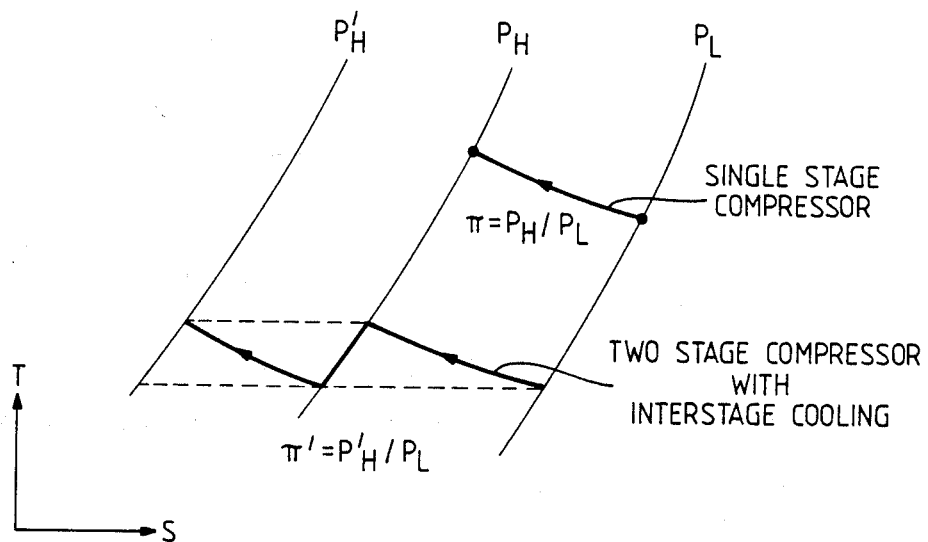
FIG. 3 is a T-S diagram illustrating compression.
Figure 2:
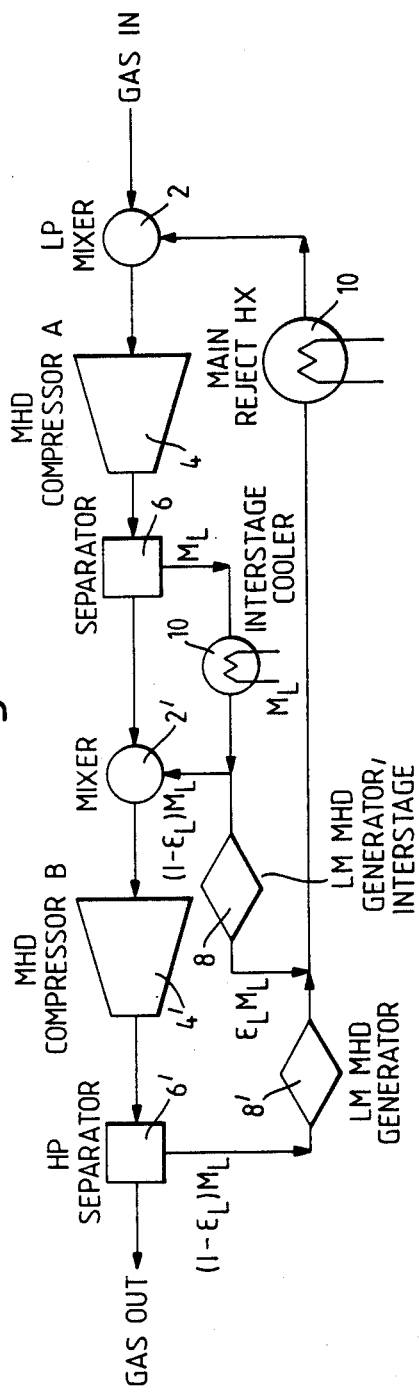
FIG. 2 is a similar diagram, but illustrating a two-stage, two-phase LM MHD gas compressor with interstage cooling.

The gas compression can be made to approach truly isothermal compression by staging of the MHD compressor and providing for interstage cooling. Obviously, the more stages provided, the closer to isothermal compression one gets. The number of stages that would be used in practice is only a function of economics. In FIG. 2 only 2 stages are shown. A fraction, $\epsilon_L$, of the total mass flow of liquid metal, $M_L$, is removed at the entrance to the second MHD compressor, B. This will increase the void fraction at the inlet to the MHD compressor B from the low void fraction which resulted from compression through the preceding MHD compressor A. This is beneficial in terms of permitting a higher overall pressure ratio $\pi' = P_H/P_L$ (see FIG. 3). At high pressure ratios, if not employing staging, the void fraction at the inlet to the MHD compressor 4, would be too high for it to work efficiently. In addition, an interstage cooler 10 is provided to cool the separated liquid metal stream at the outlet of MHD compressor A. The temperature of the liquid metal is reduced to the inlet temperature by removing the compression heat given up to the liquid metal. Thus, with many stages one can approach the lower temperature of the process throughout the compression.

Figure 4:
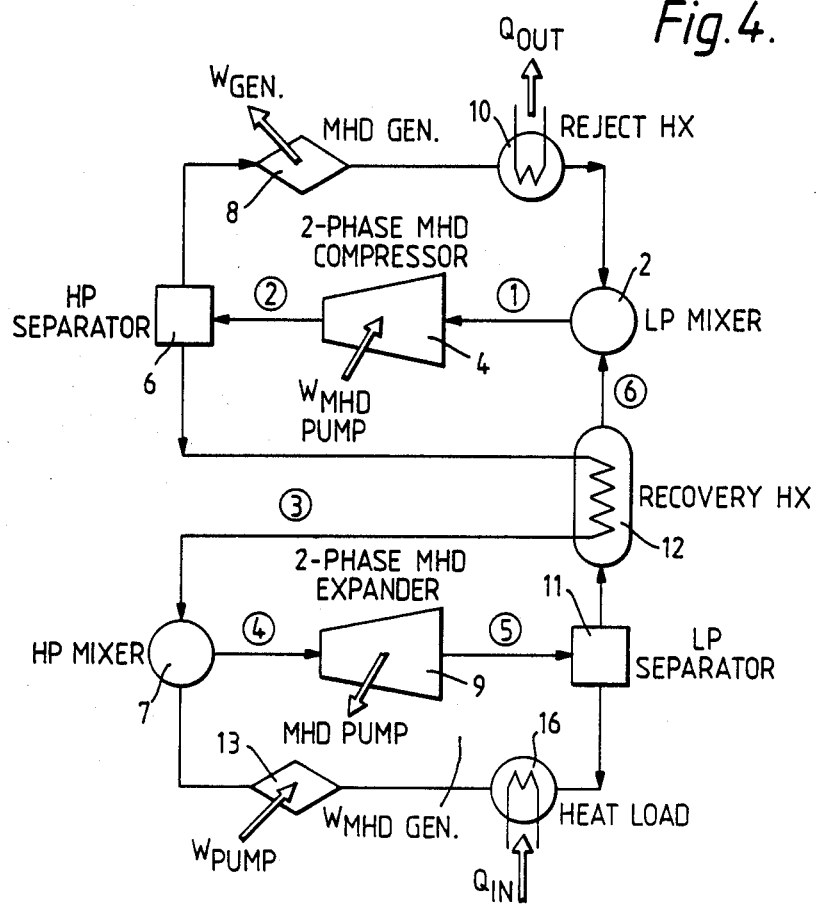
FIG. 4 is a schematic representation of a simple heat pump/chiller according to the invention.
Figure 5:
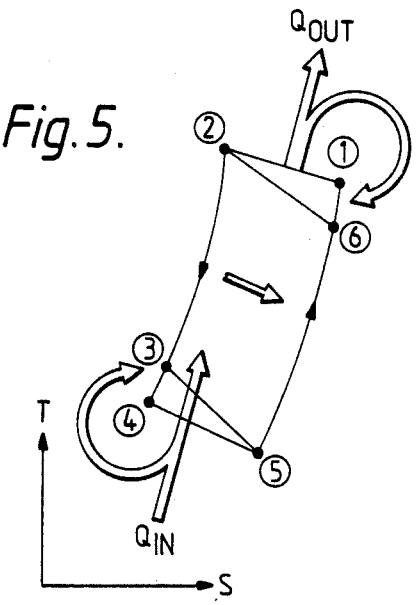
FIG. 5 is the T-S diagram of the embodiment of FIG. 4.

One can combine an MHD compressor with an expander to form a heat pump or chiller. This cycle is described in FIGS. 4 and 5. Gas is compressed by the two-phase flow MHD compressor between points 1 and 2. (Datum-point numerals such as these refer to the associated T-S diagram and, to distinguish them from the numerals designating components, are ringed.) The mixture components are separated in the high pressure (HP) separator 6, and the gas continues to a recovery (regenerative) heat exchanger 12 and is here reduced in temperature before entering the HP mixer 7 of the expansion cycle, point 3.

Here the gas is cooled down further to point 4 by mixing with colder liquid metal. Even though this has undergone heating by (1) external heat load and (2) pumping action on the liquid metal by the return MHD pump 13, the cool-down upon gas expansion exactly matches those heat loads. At the outlet of the two-phase MHD expander 9, point 5, the liquid metal/gas mixture is relatively colder than at the inlet, point 4. Although the temperature difference may be small because of the overwhelmingly higher heat capacity of the liquid metal relative to the gas, it can cool the gas from point 3 to 4 over tens of degrees, whereas it will itself only increase in temperature a fraction of this temperature difference. Therefore a considerable amount of heat, $Q_{IN}$, can be delivered directly to the liquid metal, yet the latter is stil able to perform its duty of cooling the gas in the mixing process. After separation in the LP separator 11, the gas enters the recovery heat exchanger 12 and is brought up in temperature to point 6. In the LP mixer 2 the gas temperature is raised further to the inlet condition of the two-phase MHD compressor 4, point 1, by mixing with warmer liquid metal. Even though the liquid metal has been cooled by (1) reversed MHD action in the generator 9 and (2) in the reject heat exchanger 10, heat is still available from the compression heat given up the liquid metal (given by equation (1) where $T=T_H$) to raise the temperature of the gas from 6 to 1 over tens of degrees, whilst itself only reducing in temperature a fraction of this temperature difference. Therefore, a considerable amount of heat, $Q_{OUT}$, can be delivered to the environment by direct heat exchange from the liquid metal.

The coefficient of performance for a heat pump is given by:

$$(CP)_{HEAT\ PUMP} = \frac{Q_{OUT}}{W_{NET,IN}} \quad (2)$$

where $W_{NET,IN} = W_{MHDPUMP} - W_{GEN} - (W_{MHDGEN} - W_{PUMP})$. The ideal heat pump would have a coefficient of performance:

$$(CP)_{HEAT\ PUMP,\ IDEAL} = \frac{1}{1 - \frac{T_L}{T_H}} \quad (3)$$

Because of the near isothermal expansion and the superb heat transfer of liquid metal, the lower temperature at which heat is delivered, $T_L$, is close to the minimum temperature, $T_{L,MIN}$. This implies a high coefficient of performance in the heat pump mode.

The coefficient of performance for a chiller is given by:

$$(CP)_{CHILLER} = \frac{Q_{IN}}{W_{NET,IN}} \quad (4)$$

The ideal chiller would have a coefficient of performance:

$$(CP)_{CHILLER,\ IDEAL} = \frac{1}{\frac{T_H}{T_L} - 1} \quad (5)$$

Because of the near isothermal compression and, again, the superb heat transfer of liquid metal, the upper temperature at which heat is rejected, $T_H$, is close to the maximum temperature, $T_{H,MAX}$, which can be set close to the environmental temperature, $T_0$. This promises a high coefficient of performance in the chiller mode.

Figure 6:
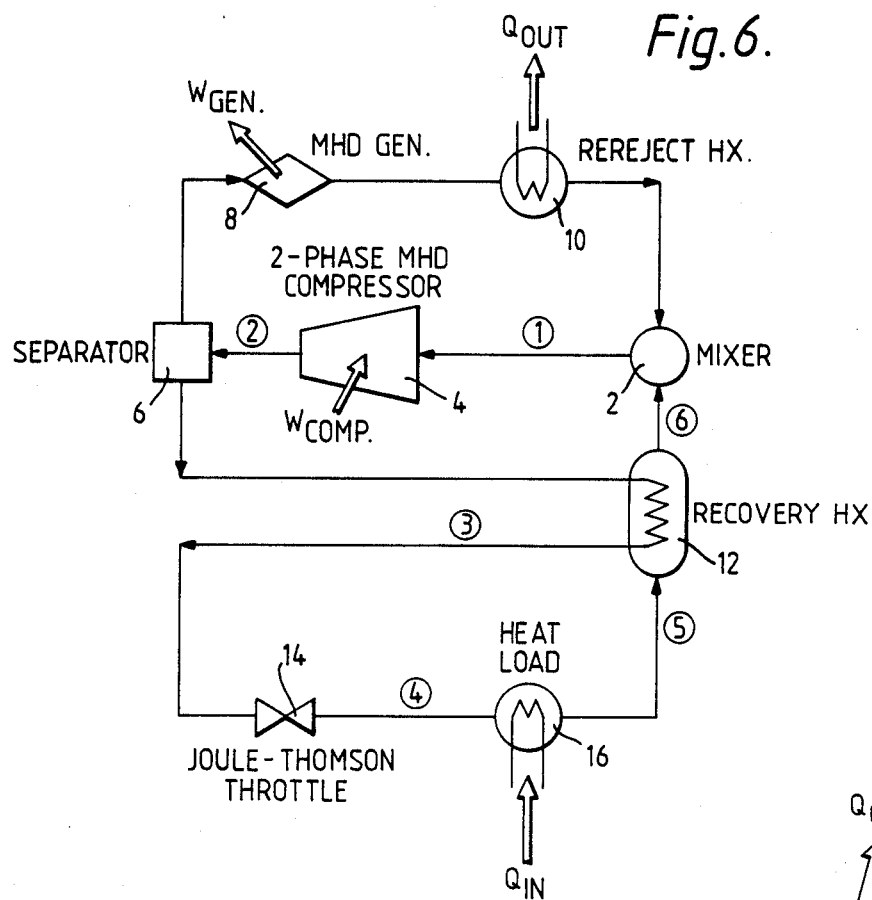
FIG. 6 is a schematic representation of a simple refrigeration cycle according to the invention.
Figure 7:
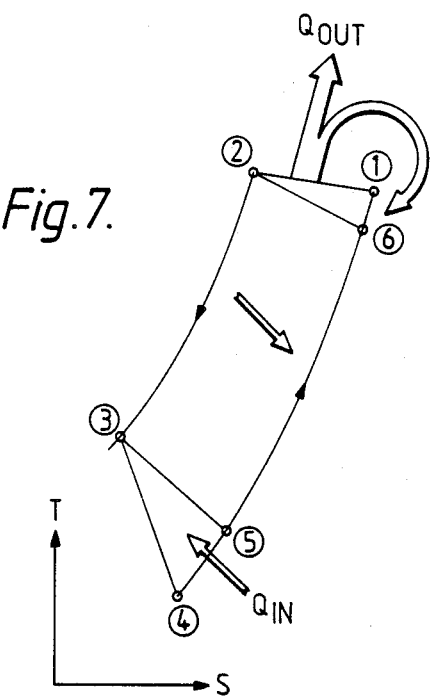
FIG. 7 is the T-S diagram of the cycle of FIG. 6.

A simple, yet highly efficient refrigeration/liquefaction cycle can be devised as shown in FIGS. 6 and 7. Gas is compressed by the two-phase MHD compressor 4 between points 1 and 2. The mixture components are separated in the separator 6 and the gas continues to a recovery (regenerative) heat exchanger 12 and is here reduced in temperature to the inlet condition of a Joule-Thomson throttle 14. It is implied that the gas insenthalpic Joule-Thomson coefficient has turned positive at this point, causing the temperature to fall during the expansion through the throttle. In the right circumstances, the gas may actually liquefy. At the outlet of the throttle 14 the gas enters the external heat-load heat exchanger 16 and is raised in temperature to point 5. The regenerative heat exchanger 12 further increases the temperature to point 6. Here, mixing with the warmer liquid metal brings the temperature to the inlet condition of the compressor 4. It should be noted that, because of the overwhelmingly higher heat capacity of the liquid metal, the latter undergoes only a very small temperature increase in the mixing process, perhaps a degree, while the gas is raised in temperature maybe a hundred degrees. This implies that the regenerative heat-exchange effectiveness may be poor (small heat exchanger 12) yet the coefficient of performance for the refrigeration cycle will still be high. The temperature of the liquid metal itself need be only a few degrees above the environmental temperature for heat rejection to cooling water, because of its characteristically superb heat exchange properties. Since in the mixing process the gas will reach a temperature very close to the liquid-metal temperature, its upper temperature will be close by the environmental temperature. This leads to, theoretically speaking, a very high coefficient of performance of the refrigeration cycle (compare with a simple Linde cycle, where reciprocating compressors with interstage cooling cause an average upper temperature of the gas cycle at around 100° C. above the environmental temperature).

If mercury is selected for electrodynamic/heat transport fluid, the temperature at point 1 can be set at a few degrees above its melting temperature, i.e. $-39°$ C.. If the upper temperature of the cycle is below the environmental temperature, an add-on chiller cycle as described above can be used (not shown here).

Although a Joule Thomson throttle was used in the above example, it is only meant for illustration purposes. Ranque-Hilsch vortex tubes or other expanders could be used as well.

FIGS. 8 to 11 illustrate the use of MHD compressors according to the invention in conjunction with MHD expanders in LMMHD energy conversion systems, where these MHD compressors replace conventional compressors with interstage cooling used in the prior art. Some advantages of the compressors according to the invention have been discussed before.

Figure 8:
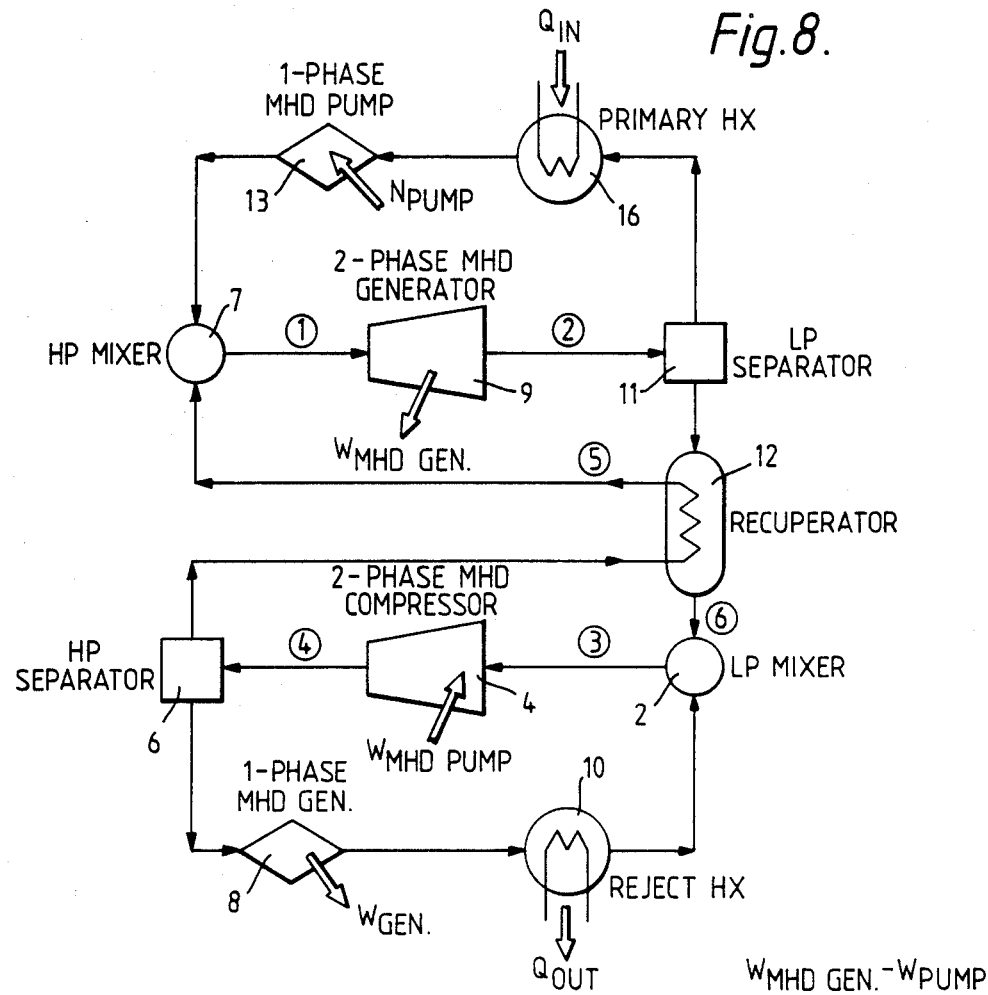
FIG. 8 is a basic MHD power cycle with two-phase flow MHD compressor.
Figure 9:
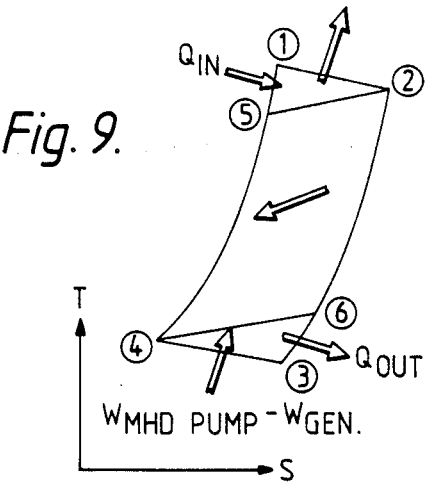
FIG. 9 is the T-S diagram of the power cycle of FIG. 8.

The most basic embodiment of the invention is shown in FIGS. 8 and 9. The thermodynamic working medium (from here on referred to as helium) is mixed with the upper temperature electrodynamic working medium (from here on referred to as sodium) in the High Pressure (HP) mixer, point 1. The two-phase mixture is expanded nearly isothermally through the two-phase flow MHD generator 9, point 2. The mixture components are separated in the Low Pressure (LP) separator 11 from where the helium is passed on to, first, the recuperator (regenerative heat exachanger) 12, and then the LP mixer 2, point 6. The sodium is pumped to the primary heat exchanger 16 where the heat, $Q_{IN}$, is delivered to the cycle. Next, the sodium is pumped by the one-phase flow MHD pump 13 to the HP mixer 7. Returning to the helium gas flow, at the LP mixer 2 the helium is mixed with the lower temperature electrodynamic working medium (from here on referred to as NaK), point 3. The two-phase mixture is compressed nearly isothermally in the two-phase flow MHD compressor 4, point 4. The mixture components are separated in the HP separator 6, from where the helium is passed on to the HP mixer 7, via the recuperator 12, point 5. NaK flows on to the one-phase flow MHD generator 8. This reduces pressure to the inlet pressure of the LP mixer 2 (ignoring component pressure losses). The NaK, however, first undergoes cooling in the reject heat exchanger 10 before entering the LP mixer 2.

This cycle is shown in the adjoining TS-diagram in FIG. 9. The net useful work, in the form of DC-current, is given by:

$$W_{NET} = W_{MHDGEN} + W_{GEN} - (W_{MHDPUMP} + W_{PUMP}) \qquad (6)$$

The net efficiency is:

$$= W_{NET}/Q_{IN} = 1 - Q_{IN}/Q_{OUT} \qquad (7)$$

Figure 11:
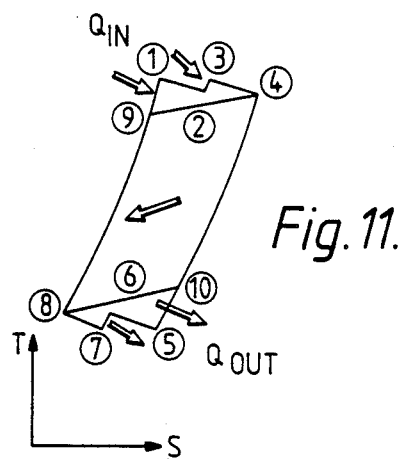
FIG. 11 is the T-S diagram of the cycle of FIG. 10.
Figure 10:
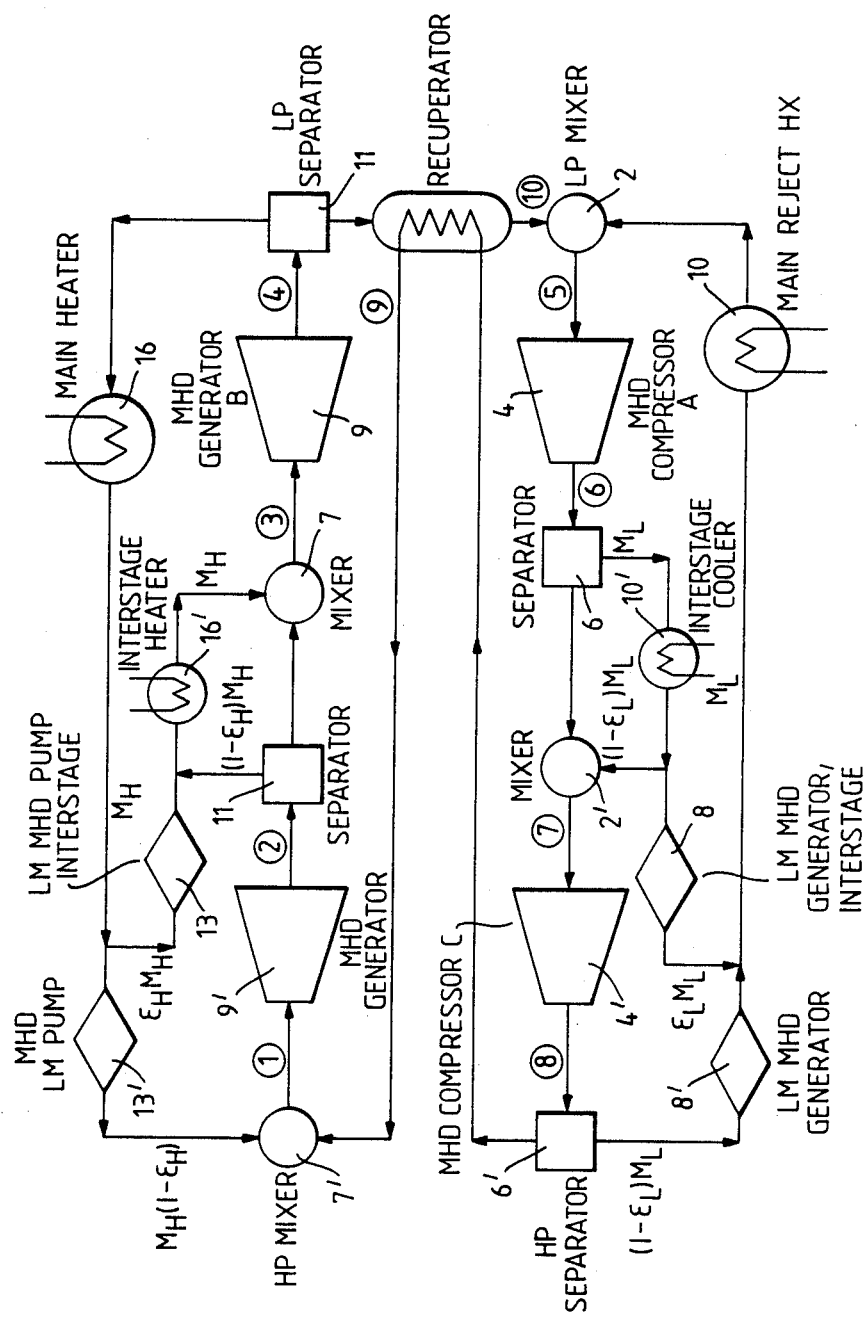
FIG. 10 represents a two-stage expansion and compression cycle.

The efficiency of the cycle would improve if the expansion and compression were truly isothermal. In effect, with a 100% effective regenerative heat exchanger such an idealized cycle (Erikson cycle) would have an efficiency equal to the Carnot efficiency. As an attempt to approach the Carnot efficiency one can stage the MHD generator and compressor, respectively, as shown in FIGS. 10 and 11. Obviously, the more stages are introduced, the closer one approaches isothermal expansion/compression. The number of stages that would be used in practice is only a function of economics. In FIG. 10 only two stages are shown. On the compression side a fraction, $\epsilon_L$, of the total mass flow of NaK, $M_L$, is removed at the entrance to the second MHD compressor B. This will increase the void fraction at the inlet to the MHD compressor B from the low void fraction which resulted from the compression through the preceding MHD compressor A. This is beneficial in terms of permitting a high pressure ratio between the pressures in the HP separator 6, and LP mixer 2. At high pressure ratios, if not employing staging, the void fraction of the inlet to the MHD compressor would have to be too high in order for it to work efficiently. In addition, an interstage cooler 10 is provided to cool the separated NaK stream at the outlet of MHD compressor A. The temperature of the NaK is reduced to the lower temperature of the cycle by removing the compression heat given up to the liquid metal. Thus, with many stages one can approach the lower temperature of the cycle throughout the compression.

The expansion process works exactly the same, but in reverse. A fraction, $\epsilon_H$, of the total mass flow of sodium, $M_H$, is added to the flow exiting from the MHD generator A. This will decrease the void fraction at the inlet to the MHD generator B from the high void fraction which resulted from the expansion through the preceding MHD generator A. This is again beneficial in terms of permitting a high pressure ratio between the pressure in the HP mixer 7 and LP separator 11. At high pressure ratios, if not employing staging, the void fraction of the outlet of the MHD generator would have to be too high in order for it to work efficiently. In addition, an interstage heater 16 is provided to heat the separated diverted sodium stream before it enters the mixer 7, of the second MHD generator B. The temperature of the sodium is increased to the upper temperature of the cycle. Thus, with many stages, one can approach the upper temperature of the cycle throughout the expansion.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method for gas compression using a two-phase flow gas/liquid metal MHD pump, comprising the stages of:
    providing a MHD pump having a converging flow duct;
    mixing the gas to be compressed with a liquid metal, to form a two-phase mixture;
    compressing the gas in said two phase mixture by driving said mixture through said converging duct, using the MHD effect, the heat of compression of said gas being substantially transferred to said liquid metal;
    separating said two-phase mixture into its gaseous and metallic components, and
    reducing the pressure of said metallic component by passing it through a pressure-reducing means.

2. The method as claimed in claim 1, comprising the further step of
    removing said heat of compression from said metallic component by heat exchange in a heat sink.

3. An n-stage, two-phase flow MHD compressor system, comprising for each stage:
    a mixer having a gas inlet, a liquid-metal inlet and a two-phase mixture outlet, in which mixer a liquid metal is mixed with the gas to be compressed, to form a two-phase mixture;
    a two-phase MHD duct having a converging configuration and being located downstream of said mixer, in which duct the gas in said two-phase mixture is compressed by the liquid metal driven therethrough by MHD action;
    a separator having a two-phase mixture inlet, a gas outlet and a liquid-metal outlet, and being located downstream of said MHD pump, in which separator said two-phase mixture is separated into its components, and
    pressure-reducing means located downstream of said separator for reducing the pressure of said metallic component.

4. The MHD compressor system as claimed in claim 3, further comprising a heat sink located upstream of said mixer for cooling, by heat exchange, said metallic component prior to its return to said mixer.

5. The MHD compressor system as claimed in claim 3, wherein said pressure-reducing means is an MHD generator, generating electric power when said separated metallic component passes therethrough.

6. The MHD compressor system as claimed in claim 3, wherein said MHD compressor is combined with a two-phase MHD expander to form a heat pump/chiller by connecting the separator of said MHD compressor with the mixer of said MHD expander and the separator of said MHD expander with the mixer of said MHD compressor.

7. The MHD compressor system as claimed in claim 6, wherein said connection is effected via the hot and cold sides, respectively, of a regenerative heat exchanger.

8. The MHD compressor system as claimed in claim 3, wherein said MHD compressor is combined with a throttle expander communicating with a heat-load heat-exchanger, to form a refrigeration cycle by connecting the gas outlet of said separator with the inlet of said expander, and the outlet of said heat exchanger with the gas inlet of said mixer.

9. The MHD compressor system as claimed in claim 8, wherein said connection is effected via the hot and cold sides, respectively, of a regenerative heat exchanger.

10. The MHD compressor system as claimed in claim 3, wherein said liquid component is a metal or alloy of metals selected from the group including sodium, potassium, lithium, lead, tin, bismuth and antimony, and said gaseous component is a gas compatible with the metal or metal alloy selected.

11. An n-stage energy conversion system, comprising:

an MHD expander, including for each stage:

a heat exchanger receiving heat from a heat source and transferring said heat at least to the liquid metal of a first liquid-metal cycle.

a single-phase MHD pump located downstream of said heat exchanger and driving said first cycle;

a mixer having a gas inlet, a liquid-metal inlet and a two-phase mixture outlet, and being located downstream of said MHD pump, in which mixer said liquid metal is mixed with a gas, producing a two-phase mixture;

a two-phase MHD generator located downstream of said mixer, in which generator said two-phase mixture is expanded, producing electrical energy;

a separator having a two-phase mixture inlet, a gas outlet and a liquid-metal outlet, and being located downstream of said MHD generator, in which separator said two-phase mixture is separated into its components, and an MHD compressor including for each stage:

a mixer having a gas inlet, a liquid-metal inlet and a two-phase mixture outlet, in which mixer the liquid metal of a second liquid-metal cycle is mixed with said gas, producing a two-phase mixture;

a two-phase MHD duct having a converging configuration and being located downstream of said mixer, in which duct the gas in said two-phase mixture is compressed by the liquid metal driven therethrough by MHD action;

a separator having a two-phase mixture inlet, a gas outlet and a liquid-metal outlet, and being located downstream of said MHD pump, in which separator said two-phase mixture is separated into its components;

a single-phase MHD pump located downstream of said separator and driving said second cycle, and a heat exchanger located upstream of said mixer, for rejecting heat drawn from said second liquid-metal cycle, wherein said MHD expander and said MHD compressor are combined by connecting the $n^{th}$-stage separator of said MHD expander with the 1st-stage mixer of said MHD compressor, and the $n^{th}$-stage separator of said MHD compressor with the 1st-stage mixer of said MHD expander, said connection being effected via the hot and cold sides, respectively, of at least one regenerative heat exchanger.

* * * * *